US006827877B2

(12) United States Patent
Chau

(10) Patent No.: US 6,827,877 B2
(45) Date of Patent: Dec. 7, 2004

(54) RED-EMITTING PHOSPHOR BLEND FOR PLASMA DISPLAY PANELS

(75) Inventor: Chung-nin Chau, Athens, PA (US)

(73) Assignee: Osram Sylvania Inc., Danvers, MA (US)

( * ) Notice: Subject to any disclaimer, the term of this patent is extended or adjusted under 35 U.S.C. 154(b) by 7 days.

(21) Appl. No.: 10/352,448

(22) Filed: Jan. 28, 2003

(65) Prior Publication Data

US 2004/0144955 A1 Jul. 29, 2004

(51) Int. Cl.$^7$ .......................... C09K 11/08; H01J 17/49; H01J 1/63
(52) U.S. Cl. .............. 252/301.4 R; 313/487; 313/582; 313/584
(58) Field of Search .................. 313/582, 584, 313/487; 252/301.4 R

(56) References Cited

U.S. PATENT DOCUMENTS

| 3,870,650 | A | * | 3/1975 | Ferri et al. | 252/301.4 R |
| 5,612,590 | A | | 3/1997 | Trushell et al. | 313/487 |
| 5,714,835 | A | * | 2/1998 | Zachau et al. | 313/486 |
| 6,051,368 | A | * | 4/2000 | Masuko et al. | 430/288.1 |
| 6,137,217 | A | | 10/2000 | Pappalardo et al. | 313/487 |

FOREIGN PATENT DOCUMENTS

GB  1110290  4/1968

OTHER PUBLICATIONS

Derwent abstract for KR 303848B Sep. 31, 2001.*
Okazaki et al., *Luminance saturation properties of PDP phosphors*, Journal of Luminescence, 87–89 (2000) 1280–1282.
Shin et al., *Energy Transfer from $Gd^{3+}$ to $Eu^{3+}$ in (Y, Gd) $BO_3:Eu^{3+}$*, Bull. Korean Chem. Soc, v. 18, n. 10 (1997) 1112–1115.
Kang et al., *Morphology of $(Y_x, Gd_{1-x}) BO_3:Eu$ Phosphor Particles Prepared by Spray Hydrolysis from Aqueous and Collodial Slutions*, Jpn. J. Appl. Phys., v. 38 (1999) L1541–L1543.
Sun et al., *Rare earth activated nanosized oxide phosphors: synthesis and optical properties*, Journal of Luminescence, 87–89 (2000) 447–450.
Kim et al., *UV and VUV characteristics of $(YGd)_2O_3$: Eu phosphor particles prepared by spray hydrolysis from polymeric precursors*, Materials Research Bulletin 38 (2003) 515–524.

* cited by examiner

Primary Examiner—C. Melissa Koslow
(74) Attorney, Agent, or Firm—Robert F. Clark

(57) ABSTRACT

A red-emitting phosphor blend is provided which comprises a mixture of a first red-emitting phosphor having a general formula of $(Y_{1-x-y}Gd_xEu_y)_2O_3$ wherein $0 \leq x \leq 0.9$ and $0.02 \leq y \leq 0.4$ and a second red-emitting phosphor having a general formula of $(Y_{1-a-b}Gd_aEU_b) BO_3$ wherein $0 \leq a \leq 1$ and $0.02 \leq b \leq 0.1$, the second red-emitting phosphor comprising from 10 to 40% by weight of the blend.

13 Claims, 2 Drawing Sheets

RED-EMITTING PHOSPHOR BLEND FOR PLASMA DISPLAY PANELS

TECHNICAL FIELD

This invention relates to phosphors for plasma display panels. More particularly, this invention relates to phosphors which are used to generate the red primary color in full color plasma display panels.

BACKGROUND OF THE INVENTION

In order to achieve full color reproduction, a plasma display panel (PDP) is composed of pixels which emit light corresponding to the three primary colors of red, green and blue. The pixels are formed from red-, green-, and blue-emitting phosphors which have been deposited on an inner wall of the device. The tri-color emission is achieved by stimulating the phosphors with vacuum ultraviolet (VUV) radiation generated by Xe—Ne gas discharges (172 nm). The luminous efficiency, color chromaticity, afterglow, and stability of the phosphors have significant roles in the PDP performance.

Typical phosphors used in PDP applications include a red-emitting (Y,Gd)BO$_3$:Eu phosphor (YOB), a green-emitting Zn$_2$SiO$_4$:Mn phosphor, and a blue-emitting BaMgAl$_{10}$O$_{17}$:Eu. The red-emitting (Y,Gd)BO$_3$:Eu phosphor exhibits good brightness under VUV excitation but its emission color is slightly orange (x=0.642, y=0.358) because of its strong emission at 592 nm. Since a redder color is preferred, Y$_2$O$_3$:Eu has in the past been considered for use as the red-emitting phosphor because of its single emission peak at 612 nm (x=0.652, y=0.347). Unfortunately, Y$_2$O$_3$:Eu exhibits a much lower brightness than YOB because of lower absorption at 172 nm.

In order to eliminate produce a redder color, a typical PDP employs an active color correcting (ACC) filter which has an absorption at about 600 nm. The ACC filter provides a dual benefit in that it absorbs both the 592 nm emission of YOB and the red 585 nm emission generated by the neon gas in the Xe—Ne discharges. FIG. 1 illustrates the effect of the ACC filter on the emissions of a typical PDP. Although this results in better red color saturation, some of the brightness benefit provided by the YOB phosphor is lost.

SUMMARY OF THE INVENTION

It is an object of the invention to obviate the disadvantages of the prior art.

It is another object of the invention to provide a red-emitting phosphor blend for plasma display panels.

In accordance with one aspect the invention, there is provided phosphor blend comprising a mixture of a first red-emitting phosphor having a general formula of (Y$_{1-x-y}$Gd$_x$Eu$_y$)$_2$O$_3$ wherein 0≦x≦0.9 and 0.02≦y≦0.4 and a second red-emitting phosphor having a general formula of (Y$_{1-a-b}$Gd$_a$Eu$_b$)BO$_3$ wherein 0≦a≦1 and 0.02≦b≦0.1, the second red-emitting phosphor comprising from 10 to 40% by weight of the blend.

DETAILED DESCRIPTION OF THE INVENTION

Figure 1:
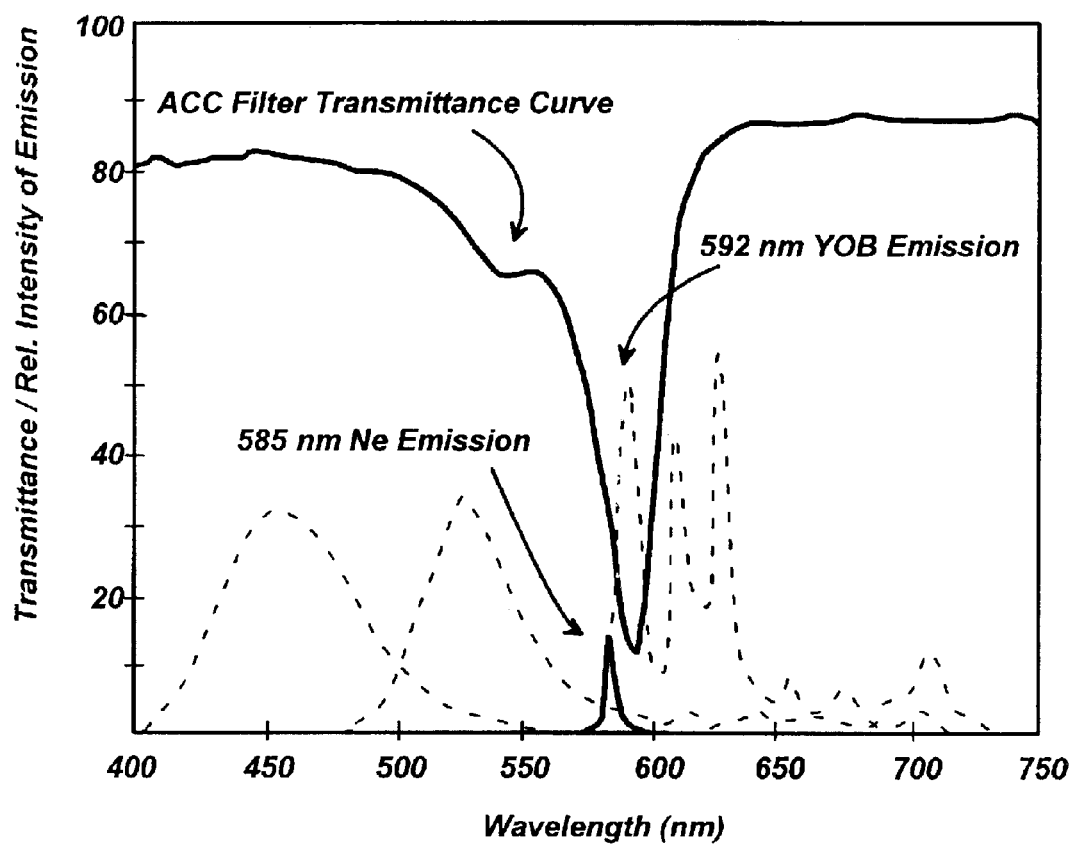
FIG. 1 is a graphical illustration of the effect of an ACC filter in a plasma display panel.

For a better understanding of the present invention, together with other and further objects, advantages and capabilities thereof, reference is made to the following disclosure and appended claims taken in conjunction with the above-described drawings.

The red-emitting Y$_2$O$_3$:Eu (YOE) can be made to have a higher 172 nm absorption and better brightness in PDP applications by substituting gadolinium for some of the yttrium. This is particularly effective when the amount of the europium activator is present in an amount equivalent to about 4 weight percent (wt. %) Eu$_2$O$_3$. The general formula of the phosphor can be represented as (Y$_{1-x-y}$Gd$_x$Eu$_y$)$_2$O$_3$ wherein 0≦x≦0.9 and 0.02≦y≦0.4. More preferably, the x and y values are: 0≦x≦0.2 and 0.04≦y≦0.08. In an even more preferred composition, x is about 0.06 and y is about 0.05.

Table 1 demonstrates the effect of the gadolinium substitution.

TABLE 1

| Sample | Eu$_2$O$_3$ wt. % | Absorption at 172 nm |
| --- | --- | --- |
| Y$_2$O$_3$ | 4.0 | 0.750 |
| Y$_2$O$_3$ | 6.5 | 0.700 |
| (Y, Gd)$_2$O$_3$ | 4.0 | 0.780 |

The performance of the (Y$_{1-x-y}$Gd$_x$Eu$_y$)$_2$O$_3$ phosphors in a plasma display panel may be further enhanced by blending the phosphor with an amount of YOB phosphor. Preferably, the YOB phosphor has a general formula (Y$_{1-a-b}$Gd$_a$Eu$_b$)BO$_3$ wherein 0≦a≦1 and 0.02≦b≦0.1. More preferably, a is about 0.2 and b is about 0.05. The YOB phosphor comprises 10% to 40% by weight of the blend and, more preferably, about 25% by weight of the blend.

EXAMPLES

Several (Y$_{1-x-y}$Gd$_x$Eu$_y$)$_2$O$_3$ phosphors containing various amounts of Gd and Eu were made by firing a 50 g amount of a (Y$_{1-x-y}$Gd$_x$Eu$_y$)$_2$O$_3$ co-precipitate. The co-precipitate was made by dissolving selected amounts of Y$_2$O$_3$, Gd$_2$O$_3$ and Eu$_2$O$_3$ in a heated nitric acid solution (400 ml conc. HNO$_3$ in 800 ml H$_2$O). An oxalic acid solution was then added and the solution was allowed to cool. Ammonium hydroxide was added and the pH of the solution adjusted to between 1 and 2. The co-precipitate was filtered, dried, and fired in a furnace at about 1500° C. for 8 hours. The fired cake was then washed in water, screened (378 mesh) and dried. In two examples, the (Y$_{1-x-y}$Gd$_x$Eu$_y$)$_2$O$_3$ was then blended with a YOB phosphor, (Y$_{0.72}$Gd$_{0.23}$Eu$_{0.05}$)BO$_3$, OSRAM SYLVANIA Type 9130. Table 2 shows the brightness of the phosphors relative to a YOB control. A 172 nm VUV excitation was used. The relative brightness is given for two ranges (1) from 520 to 730 nm and (2) from 600 to 730 nm. Since the ACC filter in a plasma display panel will absorb red emissions below 600 nm, the region of the spectrum above 600 nm becomes much more important when comparing the performance of red-emitting phosphors for PDP applications.

TABLE 2

| Example No. | $Gd_2O_3$, wt. % | $Eu_2O_3$, wt. % | Wt. % of YOB in blend | Brightness (%) rel. to YOB - 520 nm to 730 nm | Brightness (%) rel. to YOB - 600 nm to 730 nm |
|---|---|---|---|---|---|
| 1 | 0 | 4.0 | 0 | 74 | 95 |
| 2 | 0 | 6.5 | 0 | 72 | 92 |
| 3 | 5 | 4.0 | 0 | 84 | 108 |
| 4 | 0 | 4.0 | 25 | 85 | 100 |
| 5 | 5 | 4.0 | 25 | 94 | 112 |

The brightness measurements in Table 2 show that the Gd substitution increases the overall red emission of the phosphor in the 520 to 730 nm range. More importantly, however, the measurements show that the Gd substitution raises the brightness of the phosphor to greater than that of YOB in the more important 600 to 730 nm range. When the substituted phosphor is combined with 25 wt. % YOB, the brightness of the blend is even greater.

Figure 2:
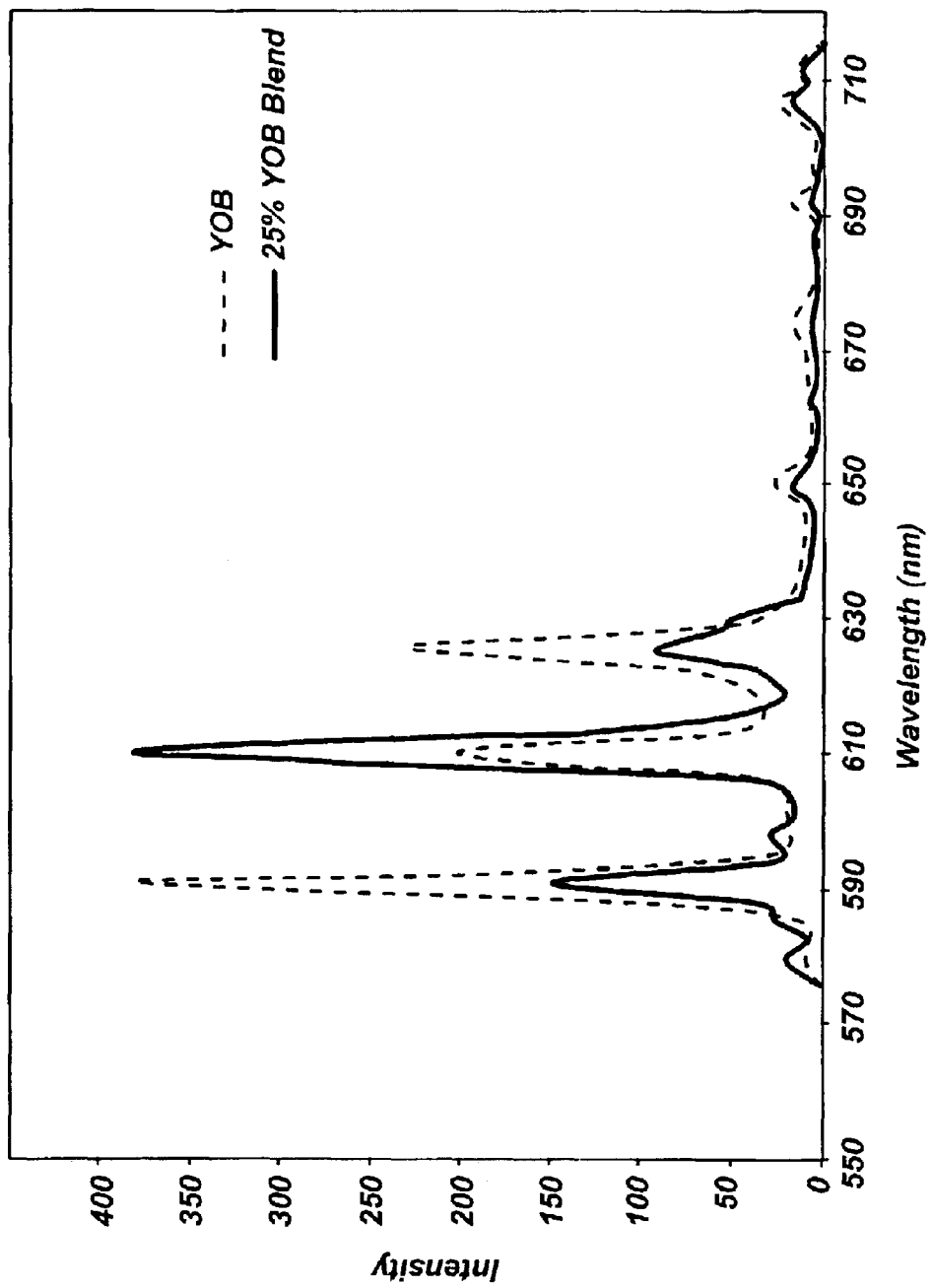
FIG. 2 is a graphical illustration comparing the emission spectra of a YOB phosphor and a blend of a (Y$_{1-x-y}$Gd$_x$Eu$_y$)$_2$O$_3$ phosphor with 25 wt. % YOB

FIG. 2 shows the emissions from a single component YOB phosphor compared with a blend containing the $(Y_{1-x-y}Gd_xEu_y)_2O_3$ phosphor and 25 wt. % YOB.

While there has been shown and described what are at the present considered the preferred embodiments of the invention, it will be obvious to those skilled in the art that various changes and modifications may be made therein without departing from the scope of the invention as defined by the appended claims.

I claim:

1. An improved plasma display panel having an active color correcting filter, the active color correcting filter having an absorption at about 600 nm, wherein the improvement comprises generating the red primary color with a blend of a first red-emitting phosphor having a general formula of $(Y_{1-x-y}Gd_xEu_y)_2O_3$ wherein $0 \leq x \leq 0.9$ and $0.02 \leq y \leq 0.4$ and a second red-emitting phosphor having a general formula of $(Y_{1-a-b}Gd_aEU_b)BO_3$ wherein $0 \leq a \leq 1$ and $0.02 \leq b \leq 0.1$, the second red-emitting phosphor comprising from 10% to 40% by weight of the blend.

2. The improved plasma display panel of claim 1 wherein the second red-emitting phosphor comprises about 25% by weight of the blend.

3. The improved plasma display panel of claim 1 wherein $0.04 \leq y \leq 0.08$.

4. The improved plasma display panel of claim 1 wherein $0 \leq x \leq 0.2$.

5. The improved plasma display panel of claim 4 wherein $0.04 \leq y \leq 0.08$.

6. The improved plasma display panel of claim 1 wherein x is about 0.06 and y is about 0.05.

7. The improved plasma display panel of claim 1 wherein a is about 0.2 and b is about 0.05.

8. The improved plasma display panel of claim 3 wherein a is about 0.2 and b is about 0.05.

9. The improved plasma display panel of claim 4 wherein a is about 0.2 and b is about 0.05.

10. The improved plasma display panel of claim 5 wherein a is about 0.2 and b is about 0.05.

11. The improved plasma display panel of claim 6 wherein a is about 0.2 and b is about 0.05.

12. A phosphor blend comprising a mixture of a first red-emitting phosphor having a general formula of $(Y_{1-x-y}Gd_xEu_y)_2O_3$ wherein x is about 0.06 and y is about 0.05 and a second red-emitting phosphor having a general formula of $(Y_{1-a-b}Gd_aEu_b)BO_3$ wherein $0 \leq a \leq 1$ and $0.02 \leq b \leq 0.1$, the second red-emitting phosphor comprising from 10% to 40% by weight of the blend.

13. The phosphor blend of claim 12 wherein a is about 0.2 and b is about 0.05.

* * * * *